Patented Nov. 27, 1945

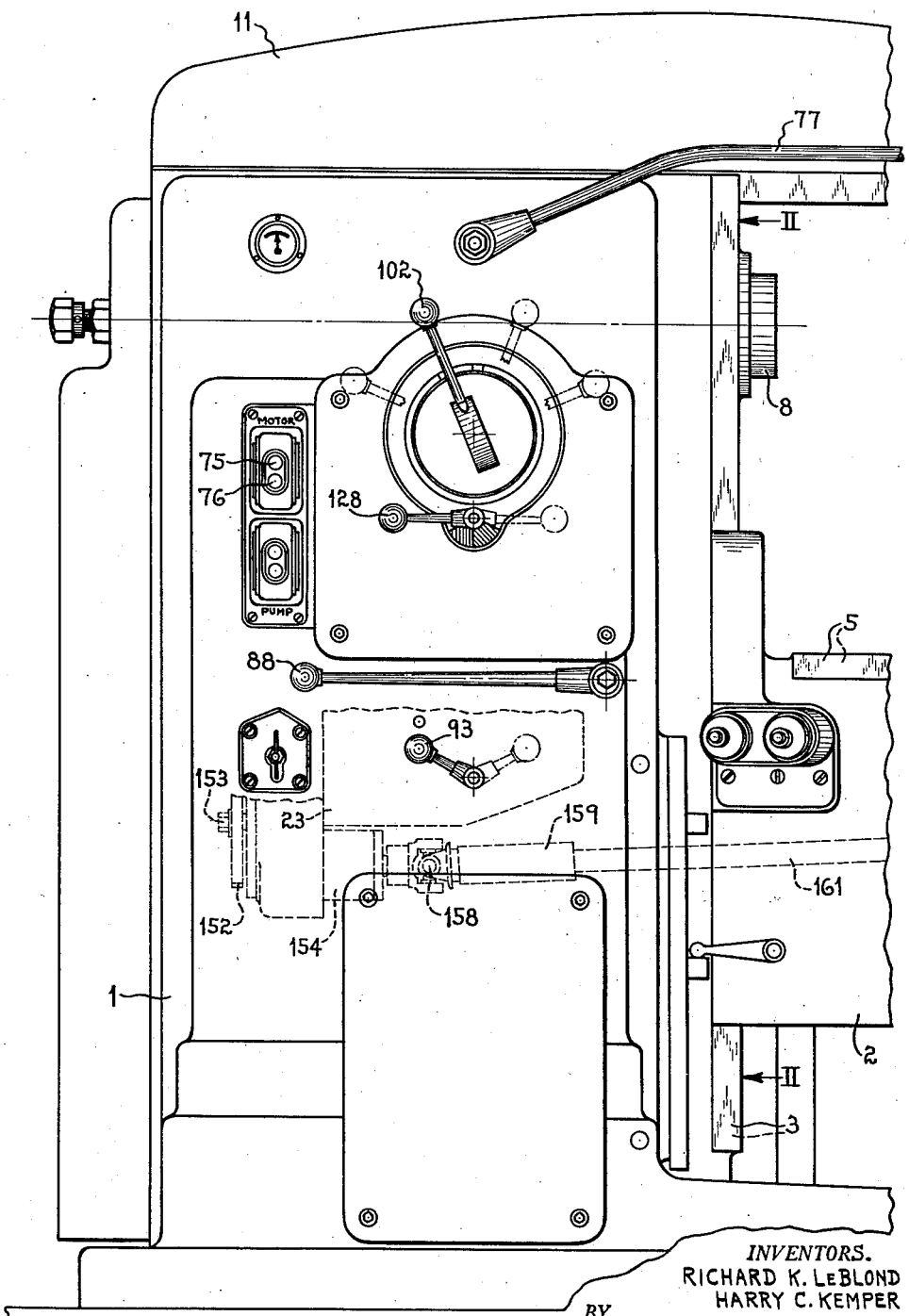
FIG. I
INVENTORS.
RICHARD K. LeBLOND
HARRY C. KEMPER
BY Toulmin & Toulmin
ATTORNEYS.

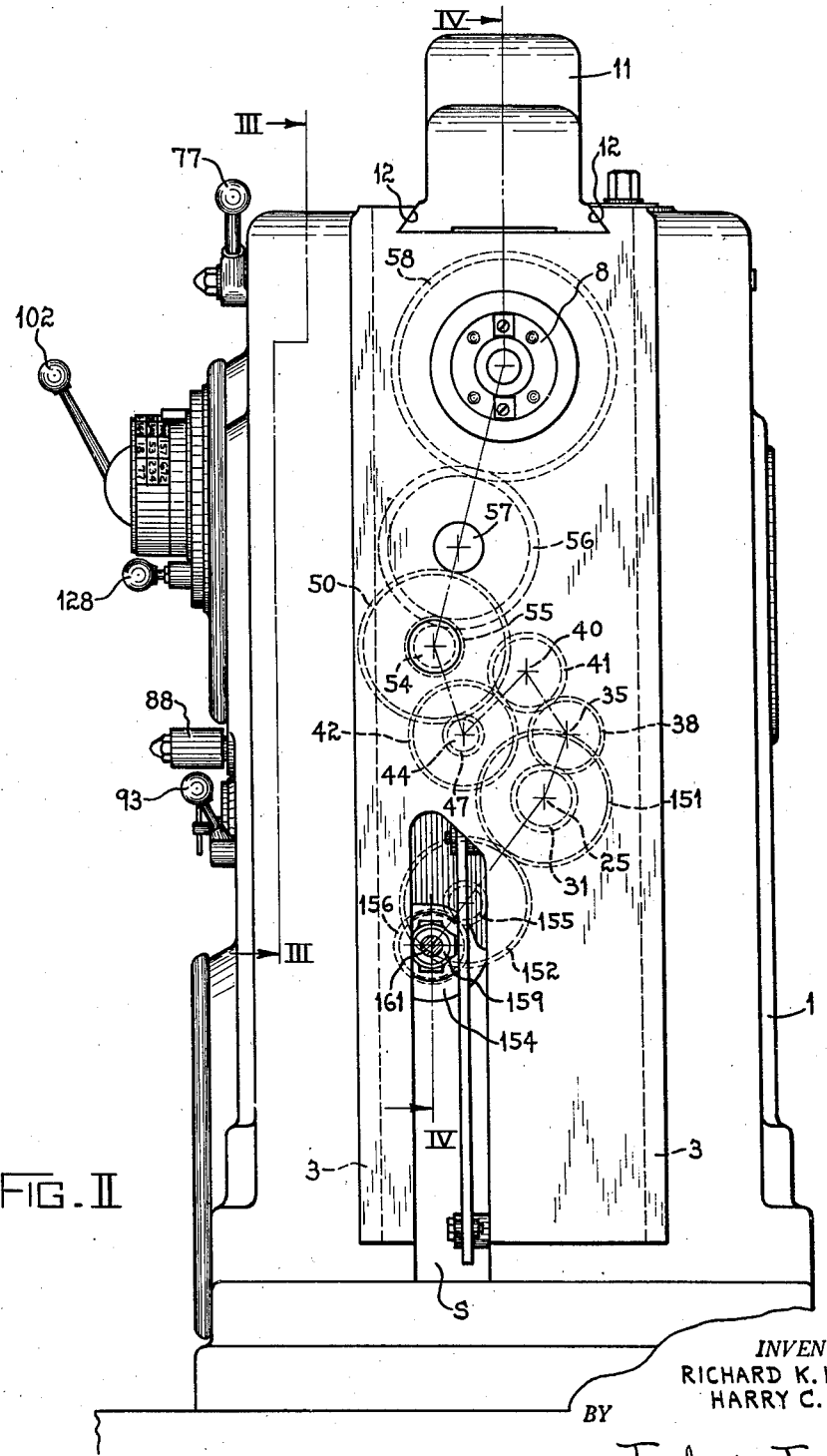

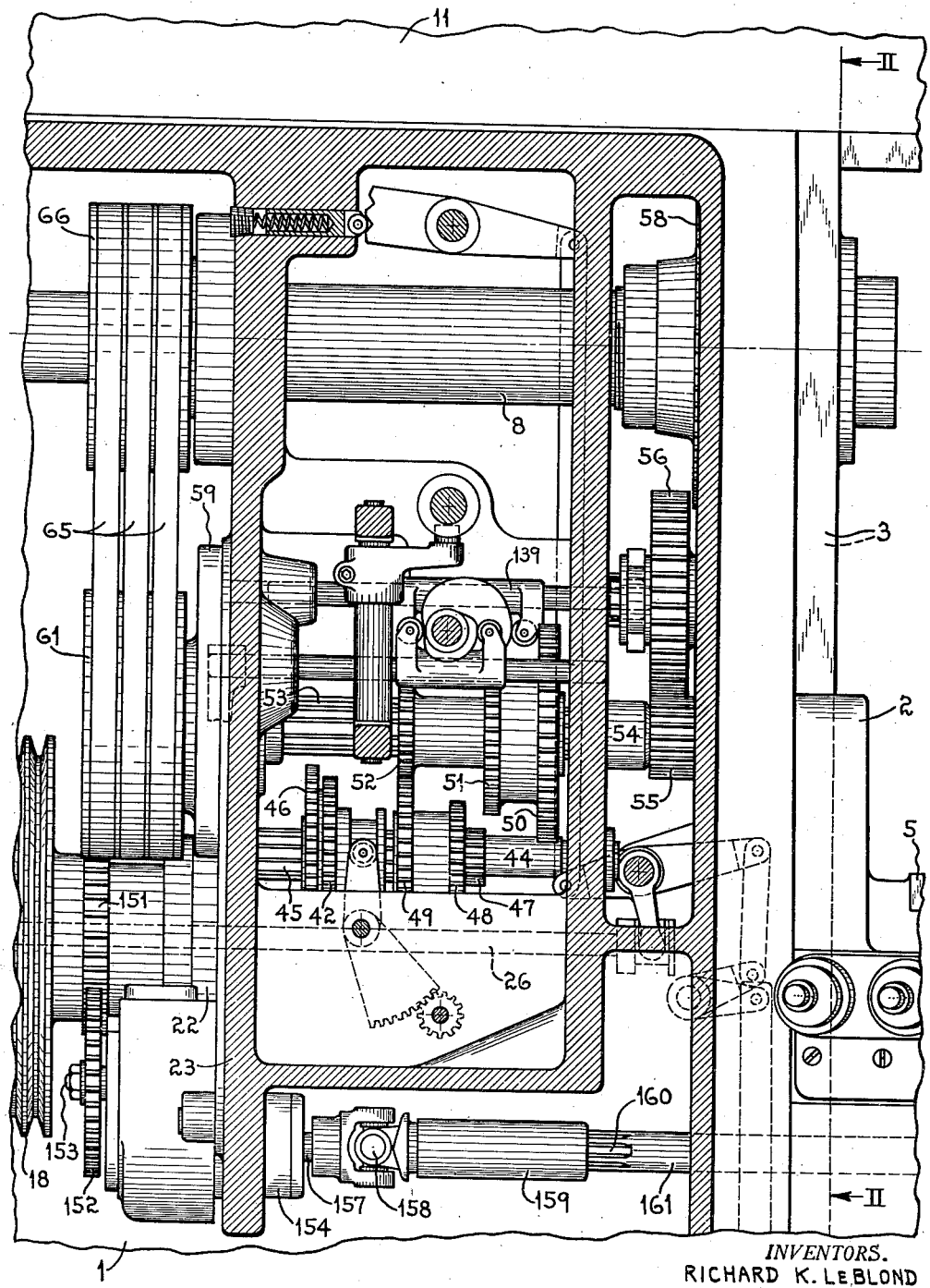
FIG. III

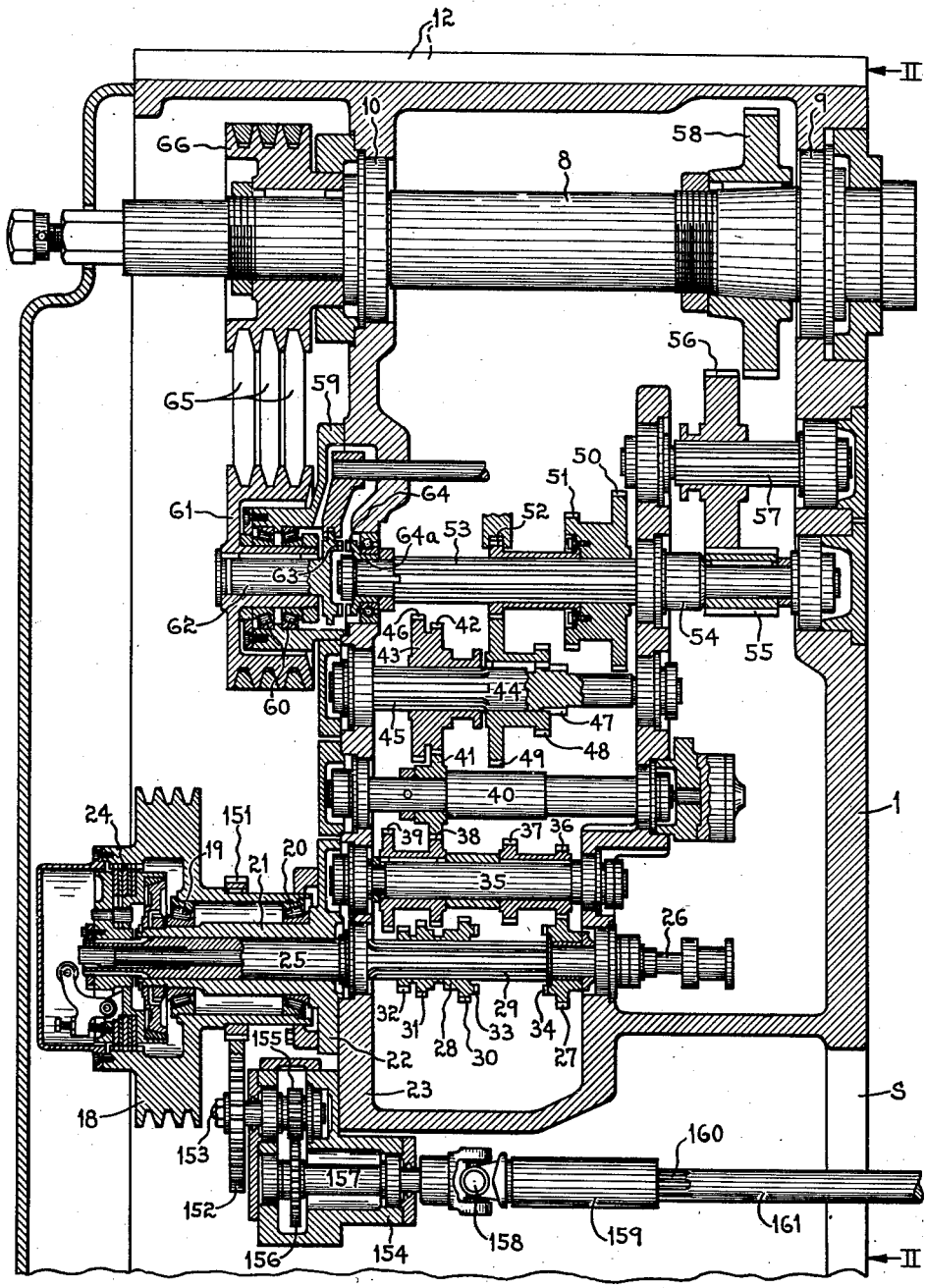
FIG. IV
INVENTORS.
RICHARD K. LeBLOND
HARRY C. KEMPER

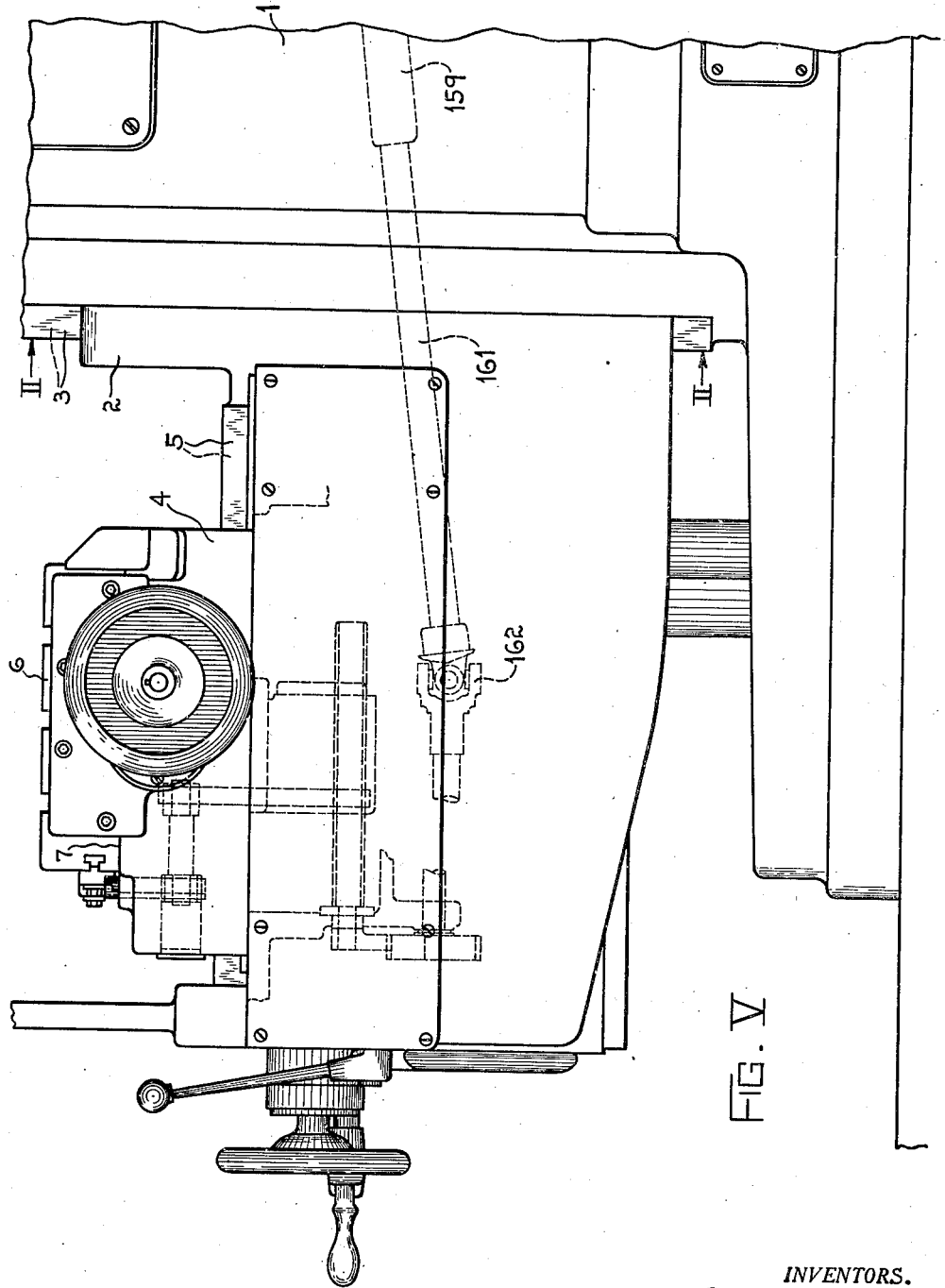

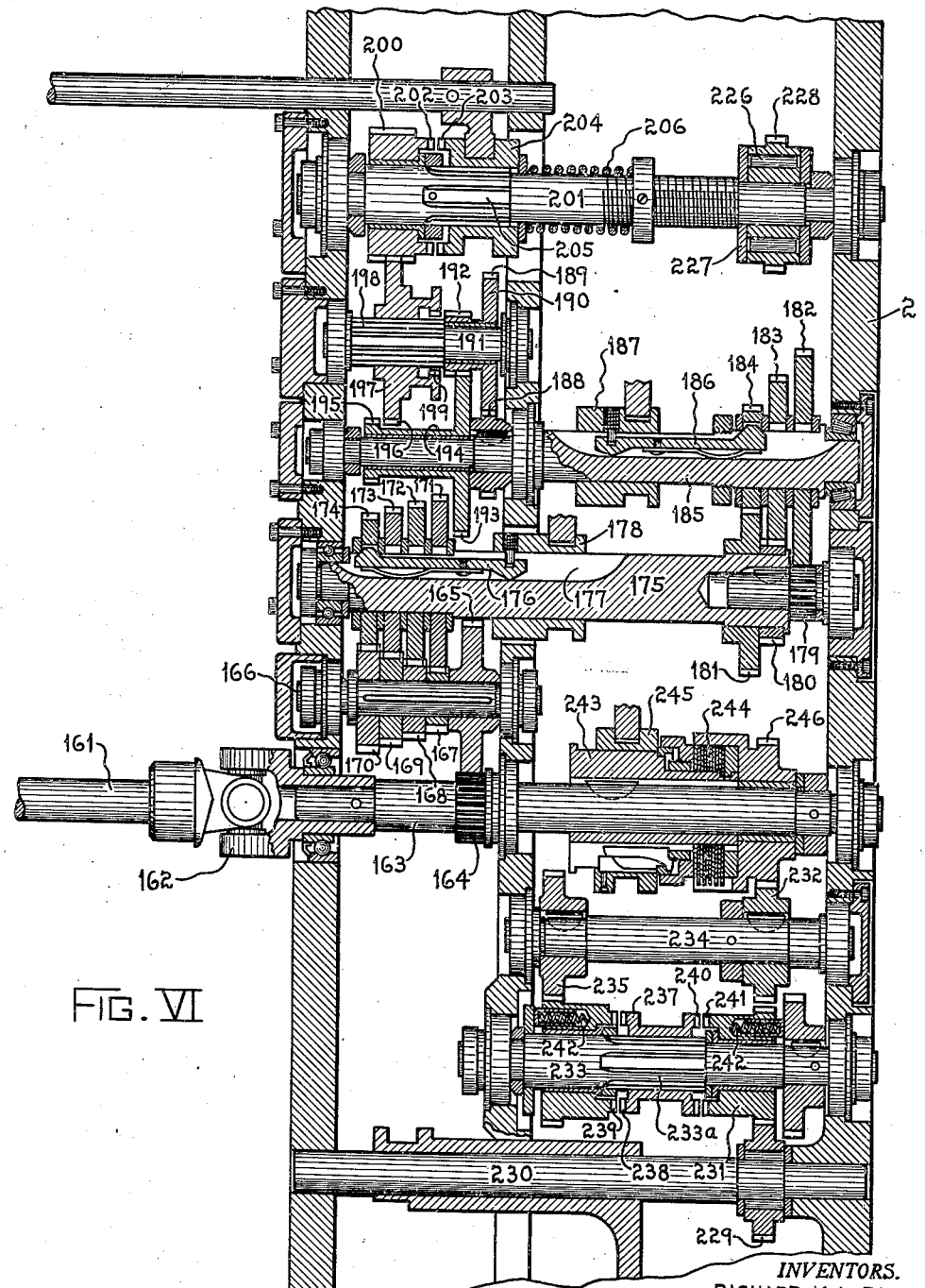
FIG. VI
INVENTORS.
RICHARD K. LeBLOND
HARRY C. KEMPER
BY
ATTORNEYS.

2,389,627

UNITED STATES PATENT OFFICE 2,389,627

MILLING MACHINE DRIVE MECHANISM

Richard K. Le Blond, Cincinnati, and Harry C. Kemper, Goshen Township, Clermont County, Ohio, assignors to The R. K. Le Blond Machine Tool Co., Cincinnati, Ohio, a corporation of Delaware Original application October 14, 1941, Serial No. 414,962, now Patent No. 2,338,121, dated January 4, 1944. Divided and this application December 18, 1943, Serial No. 514,761

1 Claim. (Cl. 90—21)

This application is a divisional application of Patent Number 2,338,121, filed January 4, 1944.

This invention pertains generally to transmission and control mechanism for milling machines, and is especially related to such mechanism for effecting and controlling rotation of the spindle, tool or cutter and the movements of the knee, the saddle, and the table, of such milling machines, which are generally known as knee and saddle type milling machines.

An object of this invention is to provide an improved power transmission connection between the cutter spindle transmission mechanism in the column and the feed transmission associated with the knee, saddle, and table of a knee and column type milling machine.

A further object is to provide a totally enclosed simplified drive connection between the transmission mechanism in the column and the transmission mechanism in the knee of a knee and column type milling machine.

And a still further object is to provide a universal joint drive shaft interconnecting the cutter spindle power transmission in the column with the feed transmission in the knee of a milling machine which is totally enclosed by the column and knee structure of the machine.

It is also an object to provide an improved universal joint drive shaft interconnecting the column gearing and the knee gearing of a milling machine which is located between the guide ways on the column and knee.

Further features and advantages of this invention will appear from a detailed description of the drawings in which:

Figure I is a left hand side elevation of the column of the milling machine, particularly showing the control levers for the main drive clutch and brake mechanism, the change speed control levers for the cutter spindle, the spindle reversing control lever, and the electrical push button station for controlling the main drive motor and a coolant pump motor when utilized.

Figure II is a front elevation of the milling machine, partly in section, on the line II—II of Figures I, III, IV and V.

Figure III is an enlarged fragmentary section of the control mechanism for the spindle drive transmission in the column as indicated by the line III—III on Figure II.

Figure IV is a diagrammatic section through the transmission mechanism for rotating the cutter spindle through the direct gear drive and through the high speed belt drive and also shows the power take-off for the feed drive transmission in the knee of the machine, as indicated by the line IV—IV in Figure II.

Figure V is a right hand side elevation of the knee, saddle, and table of the milling machine.

Figure VI is a diagrammatic sectional view through the feed drive transmission in the knee of the machine tool.

For illustrative purposes this invention is shown applied to a conventional plain knee and column type milling machine, comprising a column 1 upon which is vertically reciprocatably mounted the knee 2 on suitable guide ways 3 formed on the front face of the column 1. On top of the knee is reciprocatably mounted the saddle 4 for horizontal movement on suitable guide ways 5 formed on the top of the knee 2, and on top of the saddle 4 is slidably mounted the work table 6 upon suitable guide-ways 7 formed on top of the saddle 4.

In the column 1 is appropriately journaled cutter spindle 8 on suitable bearings 9 and 10 to which may be connected the various rotary milling cutters or arbors which are in turn supported at their outer end by conventional means such as the overarm support 11 mounted in suitable guide-ways 12 in the top of the column 1.

Power for rotating the tool spindle 8 is derived from a suitable main drive motor connected through appropriate belts to the main drive clutch and brake pulley 18 which is appropriately journaled on suitable bearings 19 and 20 carried by the projecting shaft 21 of a bracket 22 fixed to the partition wall 23 formed in the column 1 of the milling machine.

The driving pulley 18, through conventional clutch and brake mechanism 24 of a type for example as shown in Patent #1,474,112 dated November 13, 1923 may be alternately connected to or disconnected from the pulley shaft 25 by appropriately actuating the control rod 26 passing through the center of this shaft and actuating the clutch and brake device 24 in the conventional manner. In this way power is delivered to the shaft 25 upon which is journaled a relatively large driving gear 27 and a shiftable multiple gear 28 on the splined portion 29 of the shaft 25 having progressively smaller gears 30, 31, and 32 with respect to the gear 27 and also having clutch teeth 33 adapted to be engaged with mating teeth 34 on the gear 27 so that when these clutch teeth are engaged the gear 27 will be positively driven by the gear 28 from the shaft 25.

A second shaft 35 has fixed on it a series of gears 36, 37, 38, and 39 all arranged to rotate positively together. The gear 36 is constantly in mesh with the gear 27 while the gears 37, 38, and 39 are respectively engageable with the gears 30, 31, and 32 by appropriately sliding the multiple gear 28 on the splined portion 29 of the shaft 25 so that the shaft 35 may be driven at a plurality of four different speeds relative to the shaft 25.

A third shaft 40 has fixed on it a gear 41 which is arranged constantly in mesh with the gear 38 on the shaft 35 and which gear 41 in turn is arranged to be engaged by a gear 42 of a compound gear 43 slidably mounted on a shaft 44 in driving relation on the splined portion 45, thereof. Gear 43 is also arranged to slide to bring its gear 46 into direct driving engagement with the gear 39 on the shaft 35. In this way rotation of the shaft 44 from the shaft 35 may be had through the driving transmission train 38—41—42 or by shifting the compound gear 43 so that the driving power will then be transmitted from the gear 39 of the shaft 35 directly to the gear 46 to the shaft 44, so as to effect reversal of rotation for the shaft 44 as desired by appropriately shifting the gear 43.

Also fixed on the shaft 44 are a series of three gears 47, 48, and 49 which are arranged to be respectively engaged by the gears 50, 51, and 52 of a triple gear arrangement slidably mounted on the splined portion 53 of the shaft 54. By appropriately sliding the triple gear combination of gears 50—51—52 a plurality of three different speed ranges may be had between the shaft 44 and 54 and in conjunction with the four speed changes effected between the shafts 25 and 35 a series of twelve different speeds may be effected between the pulley drive shaft 25 and the shaft 54 by appropriately shifting the gear 28 and the triple gear 50—51—52.

From the shaft 54 power may be delivered to the tool spindle 8 either directly by gear drive for relatively slow speed for roughing cutter speeds or directly through belt drive transmission to the spindle to effect relatively high speed finishing cutting operations. The gear drive to the spindle 8 is effected from the pinion 55 fixed on the shaft 54 which in turn drives a gear 56 slidably mounted on a shaft 57 which in turn engages with the gear 58 fixed on the tool spindle 8 of the machine. The gear 56 is arranged in constant mesh with the gear 55 and to slide on the shaft 57 into or out of meshing engagement with the gear 58 on the spindle 8.

Journaled on the bracket 59 fixed to the partition 23 in the column of the milling machine on suitable bearings 60 is the high speed driving pulley 61. In the center bore of this pulley is slidably mounted a stub shaft 62 in sliding keyed driving relationship so as to permit axial sliding of the shaft 62 in this pulley to engage its clutch teeth 63 with mating clutch teeth 64 fixed on a clutch member 64a fixed on the shaft 54, so that by axially moving the stub shaft 62 the pulley 61 may be alternately connected or disconnected in driving relation with the shaft 54. The pulley 61 is directly connected through appropriate V belts 65 with the spindle pulley 66 fixed on the rear portion of the tool spindle 8. It is thus apparent that the method of operation of this latter drive comprises either engaging the gear 56 with the gear 58 while the clutch members 63 and 64 are disengaged to effect powerful slow speed gear drive for the tool spindle 8 or disengaging the gears 56 and 58 and engaging the clutches 63 and 64 to effect relatively high speed driving to the pulley 61 and the belts 65 and the pulley 66 mounted on the tool spindle 8.

The main drive pulley 18 is normally continuously operating at constant speed and may be stopped and started by appropriately manipulating the start and stop push buttons 75 and 76. The combined brake and clutch device 24 is driven through the constantly operating pulley 18 and is controlled by means of the spindle control lever 77 or 88.

The reverse rotation of the tool spindle 8, is accomplished by shifting the compound gear 43, Figure IV, as described for engagement of either the gears 41 and 42 of the gears 39 and 46 by means of the spindle reverse lever 93, Figure I. The twelve primary speed changes for the tool spindle 8 are effected by the sequential movement of the triple gear 28 and the triple gear 50—51—52 as described and is accomplished by means of control lever 102. The selection of the direct gear drive or the direct belt drive ranges for the tool spindle 8 is effected by the control lever 128 associated with the control lever 102 and directly below it as shown in Figure I.

Power for actuating the knee 2, saddle 4, and work table 6 is derived from the gear 151 fixed to rotate with the main driving pulley 18 at all times while the main drive pulley 18 is rotating. This gear 151 in turn drives a gear 152 fixed on a shaft 153 appropriately journaled in a bracket 154 fixed to the column 1 of the machine, shaft 153 having a gear 155 which drives a gear 156 fixed on a shaft 157 appropriately journaled in the bracket 154. Power from the shaft 157 is transmitted through the universal joint 158 having the usual telescopic sleeve 159 which operates in conjunction with the splined portion 160 of the drive shaft 161. The outer end of this drive shaft is connected through another universal joint 162 to the input drive shaft 163 of the knee 2 of the milling machine.

It is to be particularly noted, referring to Figures I, II, and V, that the universal joint drive shaft, interconnecting the cutter spindle transmission in the column and the feed transmission in the knee, is adapted to swing up and down in the slot S in the front face of the column to accommodate vertical movements of the knee. This slot is positioned intermediate the guide ways 3 of the column and has its upper portion always closed by the knee even when the knee is in its lower-most position to thus provide a totally enclosed structure for the universal joint by shaft arrangement.

Power takeoff from the shaft 163 for effecting feeding motion in the knee, saddle, and table is derived from the gear 164 formed integrally on said shaft 163 which drives a gear 165 fixed on a shaft 166 journaled in the knee 2 which also has fixed on it a series of four different size gears 167, 168, 169, and 170 forming a cone of gears each of which is engaged by respective gears 171, 172, 173 and 174 journaled on a dive key shaft 175 appropriately journaled in the knee 2 of the machine. Each of these gears 171, 172, 173, and 174 may be respectively engaged in driving relation on the shaft 175 by the usual dive key 176 which may be slid along in the slot 177 by appropriately moving the actuating spool 178. In this way four different speed changes are effected between the shaft 163 and the shaft 175.

On the shaft 175 are fixed the three different sized gears 179, 180, and 181 which in turn engage respective gears 182, 183, and 184 journaled on the second dive key shaft 185 which is also appropriately rotatably mounted in the knee 2 of the milling machine. Each of the gears 182, 183, and 184 may be respectively engaged in driving relation on this shaft 185 by appropriately manipulating the usual dive key 186 by means of its actuating spool 187. In this way a series of three different speed variations may be obtained between the shafts 175 and 185 and taken in conjunction with the four different speeds between the shafts 163 and 175 provide a total of twelve different speeds between the shafts 163 and 185 constituting a series of primary speed changes for the knee, saddle, and table feed motion.

Two primary or coarse ranges of feed are effected through the gearing comprising the gear 188 fixed on the shaft 185 which drives the gear 189 of the compound gear 190 rotatably journaled on the shaft 191 which is also rotatably mounted in the knee 2. This compound gear 190 also has the small pinion gear 192 which engages in driving relation with the gear 193 of the compound gear 194 journaled on the shaft 185 and which compound gear 194 also has a pinion 195 formed on it, which may be engaged with the gear 196 of the clutch gear 197 which is slidably mounted by splined connection 198 on the shaft 191 and which gear 197 also has an internal clutch gear 199 adapted to engage over the gear 192 of the compound gear 190. Thus if the clutch 199 is shifted into engagement with gear 192 the drive to the gear 197 will be effected from the shaft 185 to the respective gears 188, 189, 192 and to the clutch 199 directly to the gear 197 to give a relatively high rate of rotation to this gear 197. The other range of drive of relatively lower ratio comprises a drive to the shaft 185 through its gear 188 fixed thereon, the gear 189, the gear 192, and the gears 193, 195 through gear 196 into the gear 197.

The gear 196 in turn is connected to the overload feed clutch gear 200 which is appropriately journaled on a shaft 201 which shaft in turn is rotatably mounted in the knee 2 of the machine. This gear 200 which is really rotatable on the shaft 201 has formed on it clutch teeth 202 which may be engaged normally with the teeth 203 of the sliding clutch sleeve 204 splined in driving relation on the splined portion 205 of the shaft 201 and which member 204 is normally urged with its clutch teeth 203 into engagement with the clutch teeth 202 by a yielding pressure spring 206 which normally keeps these clutch teeth 202 and 203 in driving relation with each other providing no excessive load or obstruction to the rotation of the shaft 201 is caused by the meeting of the knee, saddle, or table with an obstruction, so as to prevent damage to the feeding mechanism due to excessive overloading.

Feed driving power is transmitted from the shaft 201 through the rollers 226 of the over-running clutch device 227 to the gear 228, which gear in turn is connected in driving relation with an idler gear 229 journaled on a shaft 230 fixed in the knee 2, which gear 229 simultaneously engages gears 231 and 232 respectively journaled on the shafts 233 and 234 each rotatably mounted in the knee 2. The gear 232 is fixed on the shaft 234 as is also a second gear 235 fixed on this shaft 234 which gear 235 engages a gear 236 journaled on the shaft 233. Thus, in this arrangement the gear 231 will be driven in one direction directly from the gear 229 whereas the gear 236 will be driven in the opposite direction through the gear 232, shaft 234, and gear 235.

A suitable reversing clutch comprising the clutch spool 237 appropriately mounted on the splined portion 233a of the shaft 233 has clutch teeth 238 arranged to engage clutch teeth 239 on the gear 236 and has clutch teeth 240 arranged to engage clutch teeth 241 on the gear 231. The clutch spool is slidably mounted on the splined portion 233a to effect alternate engagement of the clutch teeth 238 and 239 or clutch teeth 240 and 241, in this way effecting reversal of the drive to the shaft 233 from feed driving power transmitted from the gear 229 as described. Suitable spring cushion means 242 is provided in each of the gears 231 and 236 to effect easy and smooth engagement of the clutch teeth by the spool 237. In this way above described, the shaft 233 may be rotated at a plurality of twenty-four different feeding speeds by the various gear trains described and also be actuated at these twenty-four different speeds in either direction by manipulation of the clutch spool 237 as described.

The rapid traverse power is also applied to the shaft 233 in both directions as follows: On the shaft 163 is fixed a clutch member 243 which has a suitable multiple disc clutch 244 which may be alternately connected or disconnected with respect to the shaft 163 by manipulation of the spool 245 whereupon the gear 246 connected to the multiple disc clutch arrangement may be rendered connected or disconnected to the power input from the shaft 163. This gear 246 is in driving engagement with the gear 232 so that power connected to the multiple disc clutch 244 from the shaft 163 is transmitted at one time through the gears 246—232—229—231 or from the gears 246 and 232, shaft 234, gear 235 and gear 236, and by appropriately manipulating the clutch spool 237 may effect connecting of either of the gears 231 or 236 to the shaft 233 for applying rapid traverse power from the shaft 163 to the shaft 233. It will also be noted that the clutch 244 may be engaged at any time during the feeding operation as the actuation of the shaft 234 and the respective associated gears 231 and 236 and rapid traverse speed and the idler gear 229 connected to the gears 231 and 232 at the rapid accelerated rate will not effect the input feeding power from the shaft 201 since the over running clutch provides this increase in rotation of the shaft 233 without effecting the feed input drive. Likewise, as soon as the rapid traverse is disengaged by disengaging the clutch 244 the feed shaft 201 will again immediately pick up and continue the relative feeding motion to the shaft 233. It will also be noted that since the shaft 163 is at all times rotating constantly from the main drive pulley 18 that the rapid traverse clutch 244 may be operated to at any time effect the rapid traverse drive to the shaft 233.

The clutch spool 237 for effecting rotation of the shaft 233 in either direction at feeding speed and the clutch spool 245 of the rapid traverse multiple disc clutch 244 are operated in sequential movement by appropriate control apparatus to be described later so as to effect feed in either direction or rapid traverse in either direction for the shaft 233. The driving power from the combined feed and rapid traverse reversing transmission above described is transmitted to the knee, saddle, and table of the milling machine from the gear 247 through any suitable transmission mechanism.

The twelve primary feed changes for the work table, saddle, and knee are effected by the sequential movement of the dive key actuating spools 178 and 187. The selection of the two major ranges of work feed is obtained by the movement of the gear 197.

Having thus fully set forth and described our invention what we claim as new and desire to secure by United States Letters Patent is:

In a milling machine, a column, a knee, spaced parallel ways on said column mounting said knee for translation in a first direction, work feeding devices on said knee supporting and guiding a work piece thereon for movement in second and third directions, all said directions being mutually normal, a first shaft journaled in said column, a second shaft journaled in said knee, said shafts being substantially parallel, mechanical, variable speed connections between said second shaft and said devices, a splined sleeve, a universal joint connecting said sleeve to one of said shafts, a shaft splined to fit said sleeve, and a second universal joint connecting said splined shaft to the other of said first and second shafts, said splined shaft extending between said ways and being enclosed by said column and knee.

RICHARD K. LE BLOND.
HARRY C. KEMPER.